US005467663A

United States Patent [19]

Trowbridge

[11] Patent Number: 5,467,663
[45] Date of Patent: Nov. 21, 1995

[54] CONTROL CABLE FOR A VEHICLE SYSTEM

[75] Inventor: Jon D. Trowbridge, East Peoria, Ill.

[73] Assignee: Caterpillar Inc., Peoria, Ill.

[21] Appl. No.: 93,024

[22] Filed: Jul. 19, 1993

[51] Int. Cl.[6] .......................... G05G 1/24; G05G 11/00; B62L 5/18

[52] U.S. Cl. .......................... 74/481; 74/490.15; 74/526; 74/565

[58] Field of Search .......................... 74/479 MM, 480 R, 74/481, 482, 526, 565; 188/2 D

[56] References Cited

U.S. PATENT DOCUMENTS

| | | | |
|---|---|---|---|
| 2,045,169 | 6/1936 | Tong et al. | 74/482 |
| 2,895,346 | 7/1959 | Arch, Jr. | 74/526 |
| 2,908,183 | 10/1959 | Giovanni | 74/513 |
| 3,915,023 | 10/1975 | Lacroix | 74/230.17 |
| 3,985,040 | 10/1976 | Hale | 74/482 |
| 4,059,025 | 11/1977 | Waack et al. | 74/482 |
| 4,930,798 | 5/1990 | Yamazaki et al. | 188/2 D |
| 5,094,322 | 3/1992 | Casillas | 188/2 D |
| 5,197,347 | 3/1993 | Moffitt et al. | 74/481 |

FOREIGN PATENT DOCUMENTS

| | | | |
|---|---|---|---|
| 608677 | 11/1960 | Canada | 74/482 |
| 2514716 | 4/1983 | France | 74/481 |

*Primary Examiner*—Rodney H. Bonck
*Assistant Examiner*—Nathan O. Jensen
*Attorney, Agent, or Firm*—Calvin E. Glastetter

[57] ABSTRACT

Cable assemblies are useful for controlling the engine governor of a vehicle. On some vehicles the operator must control the governor from two different locations or operating positions of the operator. The subject arrangement includes a cable assembly having a first end portion connected to a vehicle governor, a second end portion and an intermediate portion. A lever is connected to the second end portion to control the vehicle governor. A pedal is connected to the intermediate portion to also control the vehicle governor. This arrangement of components provides a single cable assembly which can be actuated from two locations for controlling the vehicle governor.

5 Claims, 3 Drawing Sheets

CONTROL CABLE FOR A VEHICLE SYSTEM

TECHNICAL FIELD

This invention relates to an arrangement for controlling a vehicle governor and more particularly to a push-pull cable which can be actuated from two positions to control the vehicle governor.

BACKGROUND ART

In the use of backhoe loader vehicles an operator controls the vehicle functions from two different locations. One location is the normal seat position used when roading or operating the loading mechanism on the front of the vehicle. The other location is when the seat is turned and the operator is facing rearward to control the backhoe mechanism on the rear of the vehicle. The governor must be controlled from either one of the two locations or positions of the operator. When controlling the governor in this manner, two different linkage arrangements were needed, and a lost motion arrangement was required. One of the problems associated with such an arrangement having two linkage arrangements is that the linkage is expensive to produce and is difficult to position within the vehicle.

The present invention is directed to overcoming one or more of the problems as set forth above.

DISCLOSURE OF THE INVENTION

In one aspect of the present invention a vehicle includes an arrangement for controlling a vehicle governor from two different inputs. The arrangement includes a cable assembly having a first end connected to the vehicle governor. The cable further includes a second end and an intermediate portion. Means for moving the cable to control the vehicle governor is attached to the second end portion of the cable. Means for moving the cable to control the vehicle governor is attached to the intermediate portion of the cable.

The present invention provides an arrangement which controls the vehicle governor. The arrangement includes a cable which can be actuated from the end to control the governor and can also be actuated from an intermediate portion to control the governor.

BEST MODE FOR CARRYING OUT THE INVENTION

Figure 1:
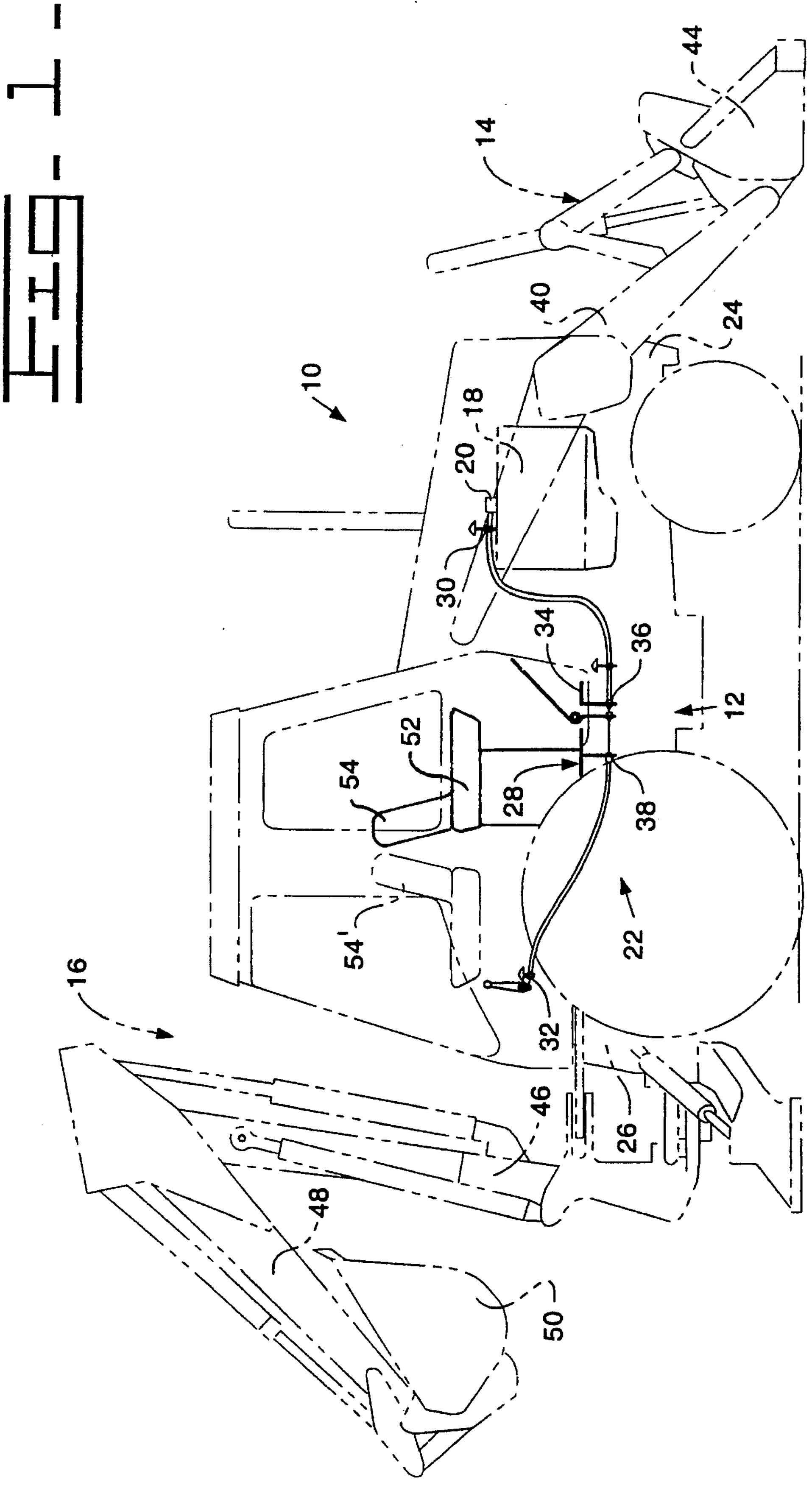
FIG. 1, is a side view in phantom lines of a vehicle showing the present invention.
Figure 2:
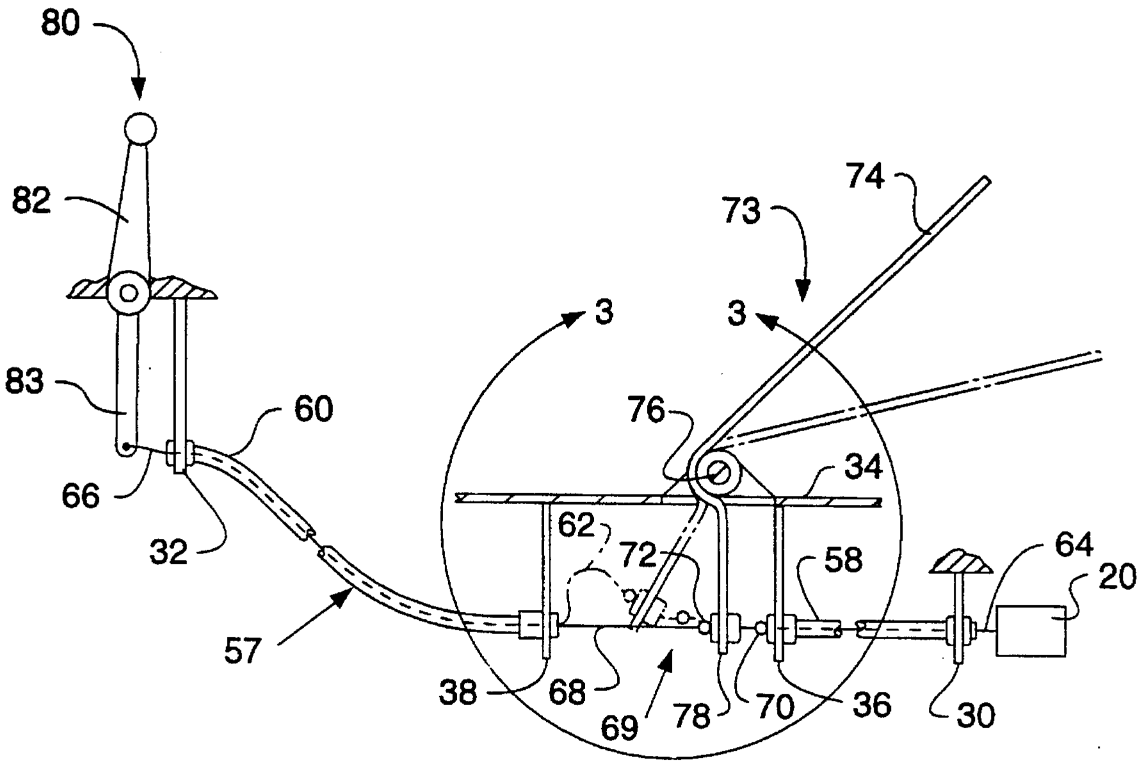
FIG. 2, is an enlarged view of the present invention.
Figure 3:
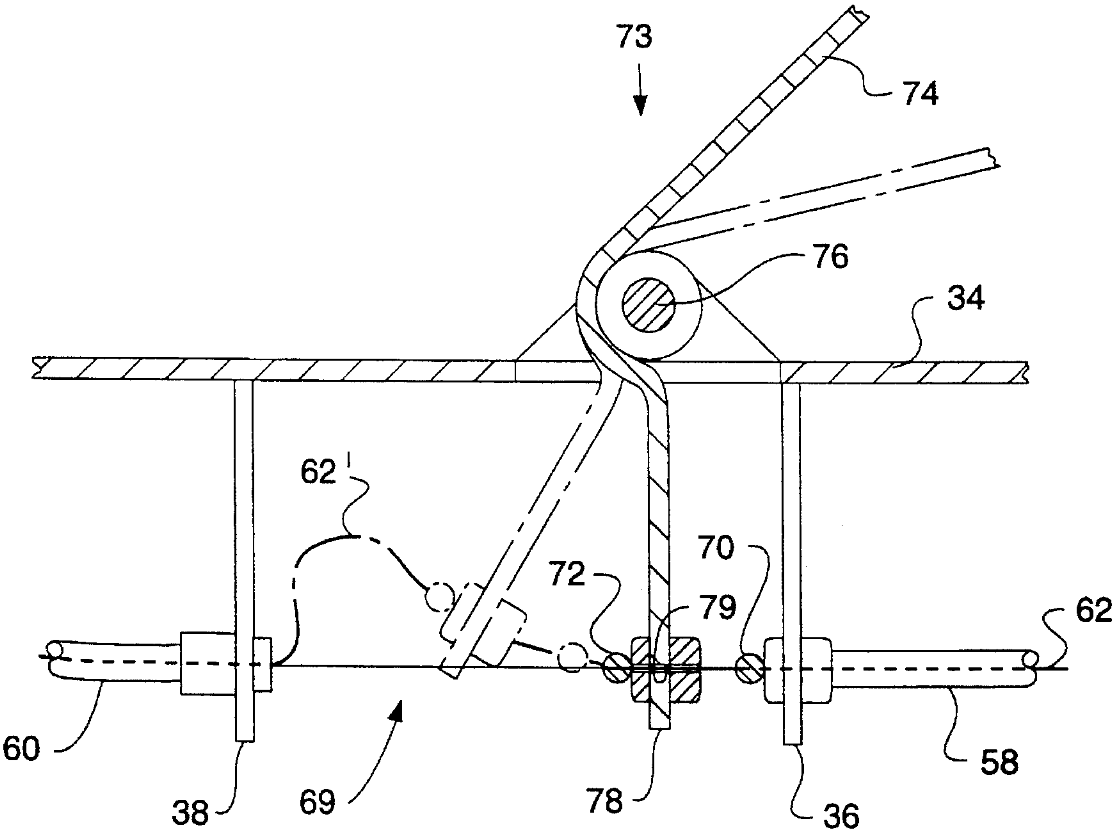
FIG. 3, is an enlargement of view 3—3 as shown in FIG. 2.

Referring to FIG. 1, a vehicle 10 includes a frame assembly 12, a front loading mechanism 14 and a rear backhoe mechanism 16. The vehicle 10 includes an engine 18 having a governor 20. A cable arrangement 22 is used to control the governor 20.

The frame assembly 12 includes a front end potion 24, a rear end portion 26 and an intermediate portion 28. The front end portion 24 includes a first mounting bracket 30. The rear end portion 26 includes a second mounting bracket 32. The intermediate portion 28 includes a mounting frame having a first mounting plate 36 and a second mounting plate 38 spaced from the first mounting plate 36.

The loading mechanism 14 includes a loader arm assembly 40 mounted on the front end portion 24. A bucket 44 is mounted to the loader arm assembly 40. The backhoe mechanism 16 includes a boom assembly 46 mounted on the rear end portion 26, a stick assembly 48 mounted on the boom 46 and a bucket 50 mounted on the stick 48.

An operators seat 52 is positioned on the vehicle 10. The operators seat 52 has a first position 54 facing forward and a second position 54', as shown by phantom lines, which is facing rearward. The first position 54 is used when roading the vehicle or operating the loading mechanism 14. The second position 54' is used when operating the backhoe mechanism 16.

The cable arrangement 22 includes a cable assembly 57. The cable assembly 57 includes a first outer sleeve 58, a second outer sleeve 60 and a central wire 62 extending through the outer sleeves 58, 60. The central wire 62 has a first end portion 64, a second end portion 66 and an intermediate portion 68. The first outer sleeve 58 is positioned and connected between the first mounting bracket 30 and the first mounting plate 36. The second outer sleeve 60 is positioned and connected between the second mounting bracket 32 and the second mounting plate 38. The first end portion 64 of the central wire 62 is connected to the governor 20. The intermediate portion 68 includes an exposed portion 69 positioned between the first outer sleeve 58 and the second outer sleeve 60. The exposed portion 69 of the central wire 62 includes a first stop 70 fixedly attached thereto. The first stop 70 will contact the outer sleeve 58 to limit movement of the central wire 62. A second stop 72 is fixedly attached to the central wire 62 in a spaced relation to the first stop 70. A first means 73 for moving the central wire 62 includes a pedal 74 pivotally mounted to the mounting frame 34 by a pin 76. The pedal 74 includes an actuating arm 78 which contacts the second stop 72. The actuating arm 78 has a hole 79 which has a larger diameter than the diameter of the central wire 62 but is smaller then the diameter of the second stop 72. The central wire 62 when moved by the pedal 74 will deform, as shown by reference numeral 62', to allow for movement of the pedal 74. A second means 80 for moving the central wire 62 includes a lever 82, having an actuating arm 83, pivotally mounted on the second frame structure 32. The lever 82 is attached to the second end portion 66 of the central wire 62.

Industrial Applicability

In use of the vehicle 10 when the seat 52 is in the first position 54 the operator is facing forward. To control the governor 20 of the engine 18 the operator rotates the pedal 74 clockwise causing the actuating arm 78 to move rearward. With the actuating arm 78 in contact with the second stop 72 on the central wire 62, rearward movement will pull the central wire 62 to control the governor 20. The lever 82 remains stationary therefore the central wire 62 behind the extending portion 78 must deform, as shown by reference numeral 62', to allow movement of the pedal 74. When the seat 52 is moved to the second position 54' the operator is facing rearward. To control the governor 20 of the engine 18 the operator rotates the lever 82 causing the central wire to move rearward to control the governor 20. The central wire 62 will slide within the hole 79 of the actuating arm 78.

In view of the forgoing, it is readily apparent that the structure of the present invention provides a cable control that will control the engine governor. The cable can be actuated from one end of the cable and also be actuated from an intermediate position. A single cable will reduce cost and will require less space within the vehicle.

Other aspects, objects and advantages of this invention can be obtained from a study of the drawing, the disclosure and the appended claims.

We claim:

1. An arrangement for controlling a vehicle from two separate inputs, comprising:

a flexible cable assembly includes a first outer sleeve, a second outer sleeve, and a central wire extending through the first and second outer sleeves, the central wire has a first end portion connected to the vehicle system, a second end portion and an intermediate portion having an exposed portion, said exposed portion having first and second stops fixedly attached thereto;

first means for moving the central wire to control the vehicle system, the first means being attached to the intermediate portion of the central wire and said second stop being adapted to contact said first means; and second means for moving the central wire to control the vehicle system, the second means being attached to the second end portion of the central wire.

2. The arrangement of claim 1 wherein the vehicle includes a first mounting bracket positioned at the first end portion of the central wire, a second mounting bracket positioned at the second end portion of the central wire and a mounting frame having a first mounting plate and a second mounting plate positioned at the intermediate portion of the central wire.

3. The arrangement of claim 2 wherein the first outer sleeve is positioned and connected between the first mounting bracket and the first mounting plate of the mounting frame.

4. The arrangement of claim 3 wherein the second outer sleeve is positioned and connected between the second mounting plate of the mounting frame and the second mounting bracket.

5. An arrangement for controlling a vehicle system from two separate inputs, comprising:

a flexible cable assembly includes a first outer sleeve, a second outer sleeve, and a central wire extending through the first and second outer sleeves, the central wire has a first portion connected to the vehicle system, a second end portion and an intermediate portion having an exposed portion having first and second stops fixedly attached thereto;

first means for moving the central wire to control the vehicle system, the first means being positioned to contact the second stop on the central wire; and second means for moving the central wire to control the vehicle system, the second means being attached to the second end portion of the central wire.

* * * * *